United States Patent Office 2,851,937
Patented Sept. 16, 1958

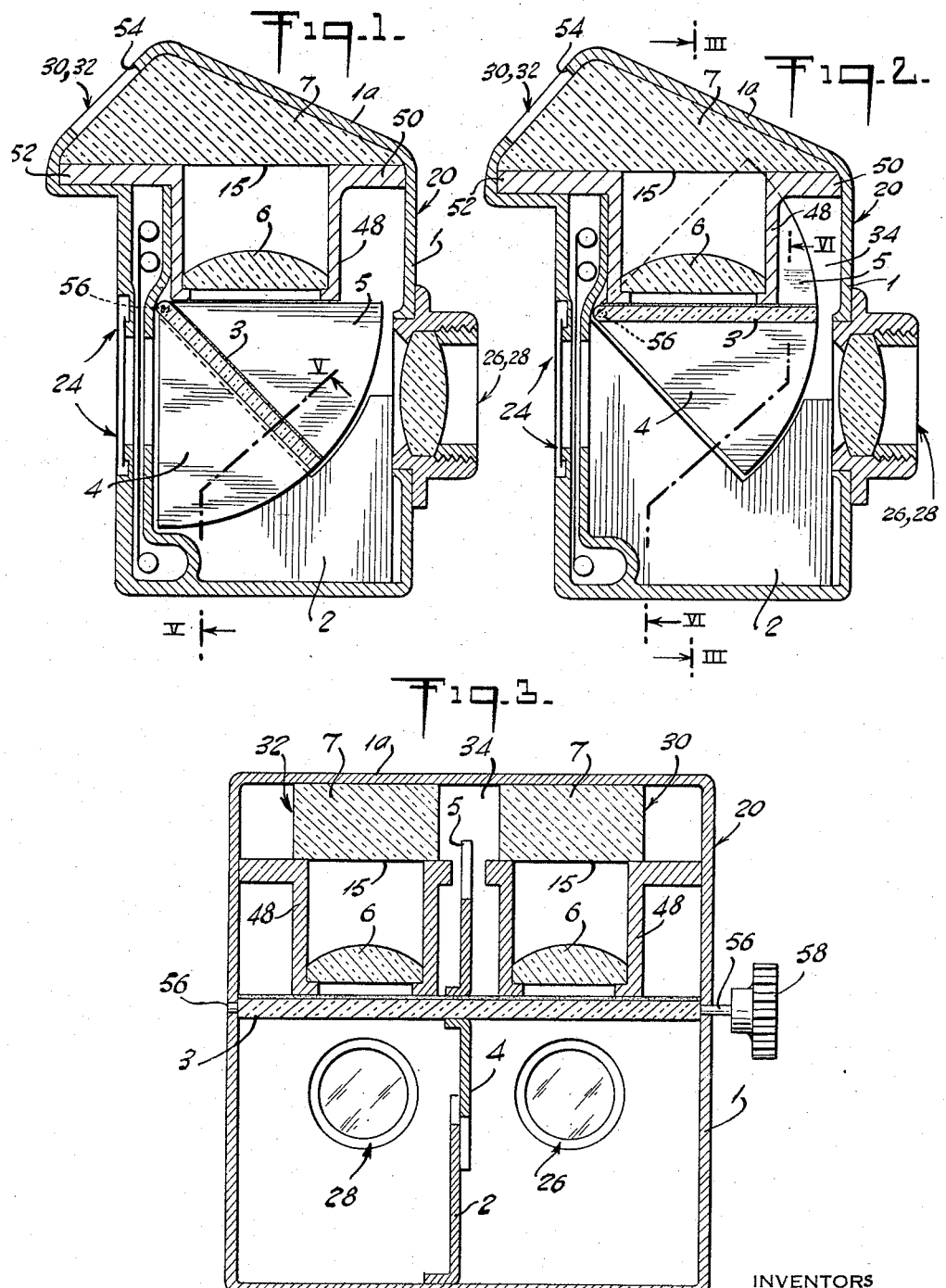

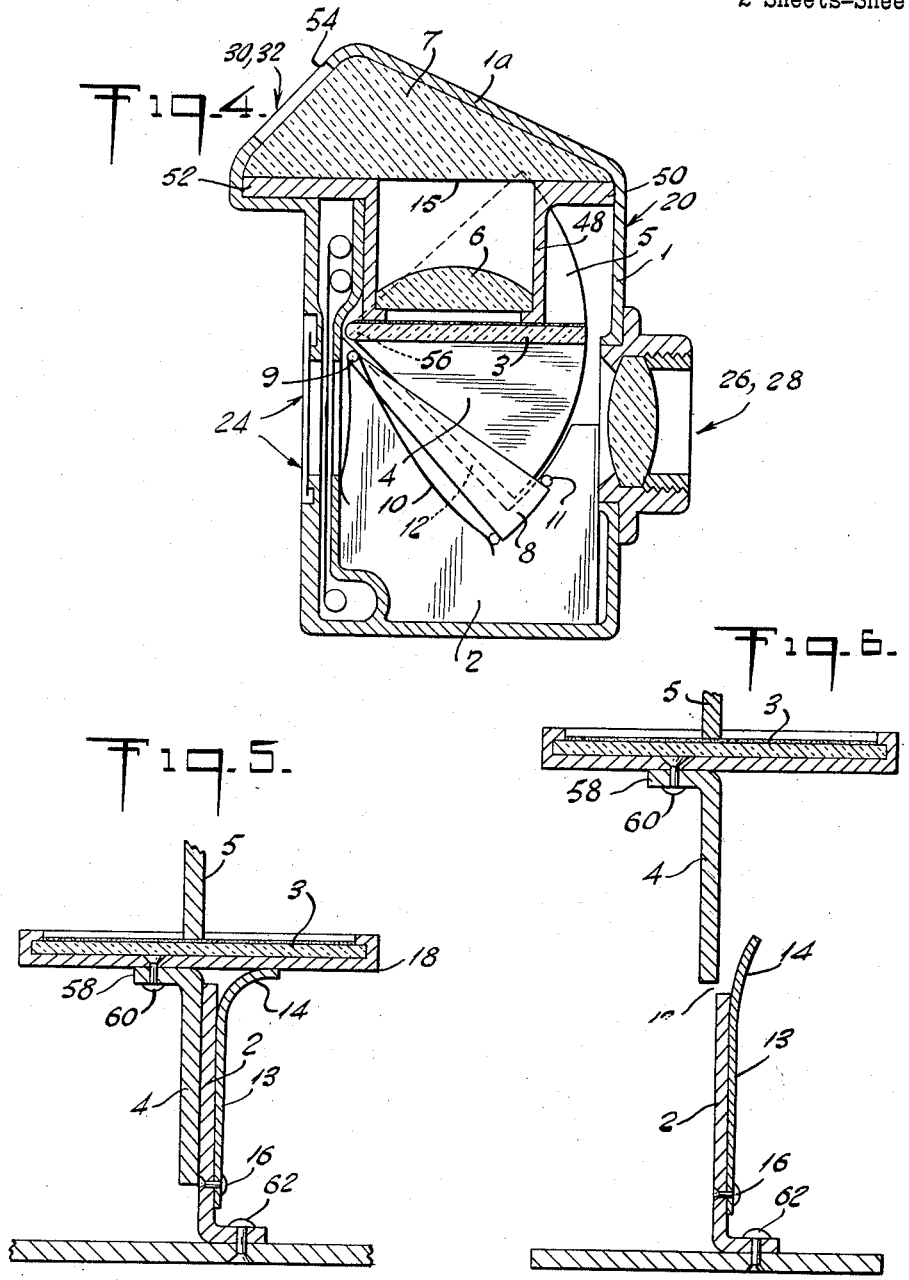

2,851,937

STEREO-REFLEX CAMERA

Herbert Ziegler, Helmuth Fischer, and Arno Gottschalk, Dresden, Germany, assignors to VEB Zeiss Ikon Dresden, Dresden, Germany Application November 22, 1955, Serial No. 548,504

Claims priority, application Germany January 6, 1955

9 Claims. (Cl. 95—18)

This invention relates to stereo cameras having two separate, matched objectives and two separate viewing arrangements, one for each objective, wherein the two images entering the camera through the two objectives are viewed in accordance with the reflex principle. The invention is particularly concerned with stereo cameras of the kind set forth—hereinafter referred to as stereo-reflex cameras—wherein one common mirror or two mirrors mounted on one common carrier deflects or deflect the entering images towards the viewing arrangements.

It is an object of the present invention to provide an arrangement in stereo-reflex cameras which prevents interference between the two images entering the camera.

It is a further object of the invention to provide an arrangement in stereo-reflex cameras which divides the interior of the camera in such a manner that two substantially self-contained compartments are obtained, each of which is associated with one of the objectives and viewing arrangements, whereby the light-rays entering through the respective objectives are confined to their respective compartments and cannot stray into and thus interfere with the neighboring one.

A still further object of the invention is the provision of an arrangement for the purposes set forth which is constituted by members of durable materials which do not affect the performance of the stereo-reflex camera even after a prolonged time of use.

Finally, the invention has as its object generally to improve on the manufacture of stereo-reflex cameras as now customarily made.

Other objects and structural details of the invention will be apparent from the following description when read in conjunction with the accompanying drawings, forming part of this specification, wherein:

Fig. 1 is a vertical sectional view of one embodiment of a stereo-reflex camera according to the invention, the mirror being in the viewing position.

Fig. 2 is a view corresponding to Fig. 1, the mirror however being in the exposure position, Fig. 3 is a sectional view taken on line III—III of Fig. 2, Fig. 4 is a vertical sectional view of a modification of the embodiment shown in Figs. 1–3, Fig. 5 is a fragmentary, sectional view of a still further modification of the embodiment shown in Figs. 1–3, the section corresponding substantially to a section taken on line V—V of Fig. 1, and Fig. 6 is a view corresponding to that of Fig. 5, the section however corresponding substantially to a section taken on line VI—VI of Fig. 2.

Referring now to the drawings and in particular to Figs. 1–3, reference numeral 20 generally indicates a stereo-reflex camera. The camera comprises a casing having a lower, box-shaped portion 1 merging into an upper portion 1a of angular profile. Two separate objectives generally indicated by 26 and 28, respectively, are mounted on the front face of the box-shaped portion 1, while a film-holding and winding arrangement generally indicated by 24 is arranged in the rear of the box-shaped portion 1. The camera further comprises two separate viewing arrangements generally indicated by 30 and 32 provided on the upper portion of the casing, each viewing arrangement cooperating with one of the objectives. The two viewing arrangements are of the same kind and comprise each a prism 7, a ground glass plate 6 and a hollow body 48. The top face of each prism 7 has a profile shaped complementarily to the profile of the upper portion 1a of the casing and bears thereagainst from below, while the straight bottom face of each prism rests on and is supported by flange portions 50, 52 of the body 48 by which flange portions, which are secured within the casing, said body 48 is suspended within the box-shaped portion 1 of the casing. The lower end of the hollow body 48 is bent inwardly and forms a flange like support for the ground glass plate 6. The prisms 7 communicate with the outside through openings 54 provided in the wall of the upper portion 1a of the casing.

A mirror 3 is pivotally carried within the box-shaped portion 1 of the casing by a rod 56. The rod 56 being journalled within the casing may be actuated by a knob 58 (see Fig. 3) provided on the outside of the casing 1 and operatively connected to the rod 56. The mirror extends substantially throughout the entire length of the casing and by turning the knob 58 it can be tilted from its inclined or viewing position shown in Fig. 1 to the exposure position shown in Figs. 2 and 3, wherein the mirror 3 is parallel with and above the plane of the optical axes of the objectives 26 and 28. It will be realized that the knob 58 here shown as actuating means for the mirror may be replaced by other means, for example the rod 56 or the like carrier for the mirror may be operatively connected with the shutter mechanism of the camera, so that when the camera is exposed the mirror automatically is brought into the exposure position.

With a view to efficiently dividing the interior of the casing into two compartments so as to prevent interference between the two separate images entering through the two objectives 26 and 28, respectively, the following arrangement is made. A separating diaphragm 2 is arranged within the lower part of the box-shaped portion 1 of the casing substantially in the center thereof, said diaphragm 2 extending between the front and rear walls of the casing and being rigidly secured thereto to constitute stationary partition means.

One of the straight defining edges of a further, sector-shaped diaphragm 4 is rigidly secured to the underside of the mirror 3 substantially in the center thereof parallel to but slightly offset to the plane of the diaphragm 2 and extending perpendicularly to the plane of the mirror along the entire width of the latter, while a third, equally sector-shaped diaphragm 5 is correspondingly secured to the top face of the mirror 3 and extends in the same plane as the diaphragm 4, the diaphragms 4 and 5 constituting movable partition means. The diaphragms 2, 4 and 5 may be secured to the wall of the casing and/or the mirror, respectively, in any suitable manner, an example of which will be described below in connection with Figs. 5 and 6. As can be seen best in Fig. 2 the free, upper edge of the stationary diaphragm 2 has an outline which is substantially complementary to that of the free edge of the diaphragm 4 so that in the exposure position of the mirror, as shown in that figure, the free edges of the diaphragms 2 and 4 lie substantially in the same horizontal plane and these two diaphragms form thus two complementary dividing surfaces which separate the space below the mirror 3 into two compartments. As has been set out the two diaphragms 2 and 4 extend in parallel planes which are only slightly offset to each other, i. e.

the distance between the two planes is adapted in such a manner that the diaphragm 4 can be moved in front of the diaphragm 2. For all practical purposes these two diaphragms can therefore be regarded as one continuous dividing surface. In the exposure position shown in Figs. 2 and 5 the sector-shaped diaphragm 5 extends into the space 34 between the two viewing arrangements 30, 32, while in the viewing position of the mirror 3 shown in Fig. 1, the diaphragm 4 is moved towards the rear of the casing into a position in front of the diaphragm 2 and substantially coextensive with the latter while the diaphragm 5 assumes substantially the position the diaphragm 4 has in the exposure position.

In the viewing position of the camera the two images enter the camera through the objectives 26, 28 respectively and are deflected by the mirror 3 towards the two viewing arrangements 30, 32 respectively, the provision of the diaphragms 2, 4 and 5 preventing interference between the two images and also preventing light strayings between the two compartments separated by the diaphragms. In the exposure position in which the mirror 3 extends parallel to the optical axes of the objectives 26 and 28 the two images impinge directly on the film provided in the rear of the casing, the position of the diaphragms 2, 4 and 5 again preventing both interference between the two images and light strayings.

The construction of the modification of the camera illustrated in Fig. 4 is substantially identical with that of Figs. 1–3 but includes in addition means for substantially covering the slit 12 and thus eliminating the light beam which is formed between the offset free edges of the diaphragms 2 and 4 when the mirror 3 is in the exposure position. These means include an auxiliary sector-shaped diaphragm or like partition means 8 which is rockably mounted within the casing at 9 and extends in a plane parallel and somewhat offset to the diaphragms 2 and 4. As can be seen in Fig. 4 the radius of this sector-shaped diaphragm 8 is somewhat longer than that of the diaphragms 4 and 5, so that its arched edge projects over the free edge of the diaphragm 2 when the mirror is in the exposure position. The auxiliary diaphragm 8 is spring-actuated by a leaf spring or like force storage means 10 bearing against the lower straight edge of the diaphragm 8 and equally mounted at 9. The spring 10 is tensioned when the mirror 3 is moved into the viewing position during which movement the bottom face of the mirror abuts against the upper straight edge of the diaphragm 8 and turns it clockwise about its pivot towards the rear of the casing. When the mirror returns into the exposure position the spring 10 is released and urges the diaphragm 8 to perform an anti-clockwise movement upwardly until it is stopped by the abutment 11 provided on the diaphragm 2. In this position the diaphragm 8 extends over the slit 12 and thus covers the latter whereby straying of the light beam formed in this slit is reduced to a minimum.

Figs. 5 and 6 illustrate a further means for covering the slit 12 and thus reducing light strayings, while the general construction of these figures is the same as that shown in Figs. 1–3. A resilient plate 13 is attached to the diaphragm 2 by a bolt 16 and projects with its end portion 14 over the free edge of the diaphragm 2. When the mirror is moved into the viewing position (Fig. 5) the end portion 14 is bent sidewardly by the mirror 3 and due to the resilience of the former it bears against the bottom face of the mirror without affecting the movements of the latter. When the mirror is tilted upwardly into the exposure position, the projecting end 14 of the plate 13, due to its elasticity, straightens up and extends thus over the slit 12 formed between the free and offset edges of the diaphragms 2 and 4, whereby this slit 12 is covered and substantially no light can escape therebetween.

Figs. 5 and 6 show also by way of example a manner in which the diaphragms 2 and 4 may be secured to the wall of the casing and the mirror, respectively. As shown in these figures, the mirror 3 is reinforced and embraced by a ledge 18 while one end of the diaphragm 4 is bent over to form a flange portion 58 which is riveted or otherwise secured to the ledge 18 by a rivet or bolt 60. In a corresponding manner the bottom edge of the diaphragm 2 is flanged over and riveted or otherwise secured to the wall of the casing 1.

We have described preferred embodiments of our invention, but it is understood that this disclosure is for the purpose of illustration, and that various omissions and changes in shape, proportion and arrangement of parts, as well as the substitution of equivalent elements for the arrangements shown and described may be made without departing from the spirit and scope of the invention as set forth in the appended claims.

What we claim is:

1. In a stereo camera equipped with two objectives defining two paths for separate light beams emanating from an object, a viewing arrangement for each objective, film mounting means aligned with said objectives and adapted for supporting photographic film to be exposed to both said light beams simultaneously, and mirror means having opposite surfaces at least one of which is reflective and arranged for selective movement to a first position in which said paths between said objectives and said film mounting means are intersected by said mirror means for deflection of said light beams through the intermediary of the reflective one of said surfaces toward said viewing arrangements, and for selective movement to a second position out of said paths to permit said light beams to continue to said film mounting means; the improvement comprising means located between said paths for isolating the same optically from one another, said isolating means comprising first partition means positioned stationarily between said paths and in a first plane, and second partition means rigidly connected to said mirror means for movement therewith and extending from both of said opposite surfaces of the latter in a second plane parallel to and closely adjacent said first plane, whereby said paths are optically isolated from one another along their entire lengths from said objectives to said viewing arrangements upon movement of said mirror means to said first position, and from said objectives to said film mounting means upon movement of said mirror means to said second position.

2. In a stereo camera including a casing, two objectives in said casing and defining two paths for separate light beams emanating from an object, a viewing arrangement for each objective, means mounted in said casing at location spaced from said viewing arrangements for supporting photographic film to be exposed to both said light beams simultaneously, and mirror means having opposite surfaces at least one of which is reflective, said mirror means being mounted in said casing and arranged for selective movement to a first position so as to angularly intersect said paths between said objectives and said film supporting means for deflection of said light beams through the intermediary of the reflective one of said surfaces toward said viewing arrangements, and for selective movement to a second position out of said paths for enabling said light beams to pass toward said film supporting means; the improvement comprising separating means located between said paths for excluding transfer of light from one of said paths to the other, said separating means comprising first partition means stationarily disposed in said casing substantially longitudinally of and between said paths and in a first plane, and second partition means rigidly connected to said mirror means for movement therewith and extending from both of said opposite surfaces of the latter in a second plane parallel to and closely adjacent said first plane, whereby transfer of light between said paths is prevented along their entire lengths from said objectives to said viewing arrangements upon movement of said mirror means to said first position, and from said objectives to said film supporting means upon movement of said mirror means to said second position.

3. In a stereo camera as set forth in claim 2, said second partition means being segment-shaped.

4. In a stereo camera having a casing and equipped with two objectives defining two paths for separate light beams emanating from an object, two viewing arrangements, one for each objective, means operatively mounted in said casing for supporting photographic film to be exposed to both said light beams simultaneously, and a mirror having opposite surfaces at least one of which is reflective and arranged in said casing for selective swinging movement to a first position so as to angularly intersect both said paths between said objectives and said film supporting means to deflect said light beams through the intermediary of the reflective one of said surfaces toward said viewing arrangements, and for selective swinging movement to a second position out of said paths to permit said light beams to pass toward said film supporting means; the improvement comprising first partition means positioned fixedly in said casing substantially longitudinally of and between said paths and in a first plane, second partition means rigidly connected to said mirror for movement therewith and extending from the other one of said opposite surfaces of the latter in a second plane parallel to and closely adjacent said first plane, third partition means rockably mounted in said casing adjacent said mirror and in a third plane parallel to and slightly offset from said first and second planes, and means operatively interconnecting said mirror and said third partition means for joint movement to juxtapose said third partition means to the adjacent boundaries of said first and second partition means when said mirror is in said second position, whereby said paths are optically isolated from one another along their entire lengths from said objectives to said viewing arrangements upon movement of said mirror to said first position, and from said objectives to said film supporting means upon movement of said mirror to said second position.

5. In a stereo camera as claimed in claim 4; a stop member provided on said first partition means for engagement by said third partition means so as to impede further movement of the latter when said mirror arrives in said second position.

6. In a stereo camera as claimed in claim 5; said means operatively interconnecting said mirror and said third partition means comprising force storage means urging said third partition means toward said stop member.

7. In a stereo camera as set forth in claim 4, said third partition means being segment-shaped.

8. In a stereo camera having a casing equipped with two objectives defining spaced optical axes, a viewing arrangement for each of said objectives, film holding means disposed in alignment with said objectives and adapted for supporting photographic film to be exposed to the two images of an object being photographed projected through said objectives, and a mirror provided with upper and lower surfaces and arranged in said casing for selective movement to a first position in which said upper surface angularly intersects said optical axes so as to deflect said images away from said film holding means and toward said viewing arrangements, and for selective movement to a second position spaced from said axes to permit said images to be projected to said film holding means; the improvement comprising means located between said axes in said casing for dividing that portion of the same between said objectives and said film holding means into two optically isolated compartments, said dividing means comprising first partition means fixedly disposed in said casing between said axes and in a first plane, second partition means rigidly connected to said mirror for movement therewith and extending substantially perpendicularly from said lower surface of said mirror in a second plane parallel to and closely adjacent said first plane, and a resilient partition member located laterally adjacent and extending along said first and second partition means, said resilient partition member being dimensioned to overlap the adjacent boundaries of said first and second partition means when said mirror is in said second position, whereby transmission of stray light through said dividing means is prevented in all positions of said mirror.

9. In a stereo camera as claimed in claim 8; said resilient partition member being secured to said first partition means and projecting above the upper edge thereof.

References Cited in the file of this patent

UNITED STATES PATENTS

| | | |
|---|---|---|
| 2,136,148 | Nuchterlein | Nov. 8, 1938 |
| 2,230,251 | Jochum | Feb. 4, 1941 |
| 2,241,185 | Cohen | May 6, 1941 |
| 2,333,389 | Ringer | Nov. 2, 1943 |
| 2,458,466 | Campbell | Jan. 4, 1949 |
| 2,622,497 | Cornut | Dec. 23, 1952 |
| 2,737,079 | Brown | Mar. 6, 1956 |